United States Patent [19]

Gorski

[11] Patent Number: 4,908,008
[45] Date of Patent: Mar. 13, 1990

[54] SAFETY GUARD

[75] Inventor: John R. Gorski, Fox Point, Wis.

[73] Assignee: The Falk Corporation, Milwaukee, Wis.

[21] Appl. No.: 268,254

[22] Filed: Nov. 7, 1988

[51] Int. Cl.$^4$ .......................... F16H 57/02; F16H 7/18
[52] U.S. Cl. .................................................... 474/146
[58] Field of Search ............................... 474/144–147, 474/140, 151; 180/84; 280/152 R, 159, 160, 160.1; 74/608

[56] References Cited

U.S. PATENT DOCUMENTS

| | | | |
|---|---|---|---|
| 2,613,544 | 10/1952 | Cullman | 474/146 X |
| 2,695,528 | 11/1954 | Bernhard | 474/69 |
| 3,576,142 | 4/1971 | Matthews | 74/600 R |
| 3,811,340 | 5/1974 | Morse | 474/58 |
| 3,885,471 | 5/1975 | Morine et al. | 474/144 |
| 4,199,271 | 4/1980 | Riedl | 404/113 |
| 4,425,105 | 1/1984 | Edl et al. | 474/140 |
| 4,504,093 | 3/1985 | Grasse | 474/146 X |

Primary Examiner—Thuy M. Bui
Attorney, Agent, or Firm—Quarles & Brady

[57] ABSTRACT

A safety guard for enclosing the flexible drive between an assemblage of a driving shaft and a driven shaft has a backplate with elongated openings. The driving and driven shafts extend through the elongated openings. A mounting track is attached to the rear of the backplate. A mounting nut is captured within the mounting track such that the nut can slide over the length of the track. A bolt fastens to the mounting nut to attack the backplate to the assemblage of the driving and driven shafts. In a preferred form, mounting strips having a slot are attached to the assemblage of the driving and driven shafts. The slots are preferably arranged in a direction that intersects the mounting track, and the bolt can be located along the slot. A cover can be releasably mounted against the backplate to form an enclosure. Closure strips are inserted into the portions of the elongated openings to further enclose the flexible drive.

14 Claims, 3 Drawing Sheets

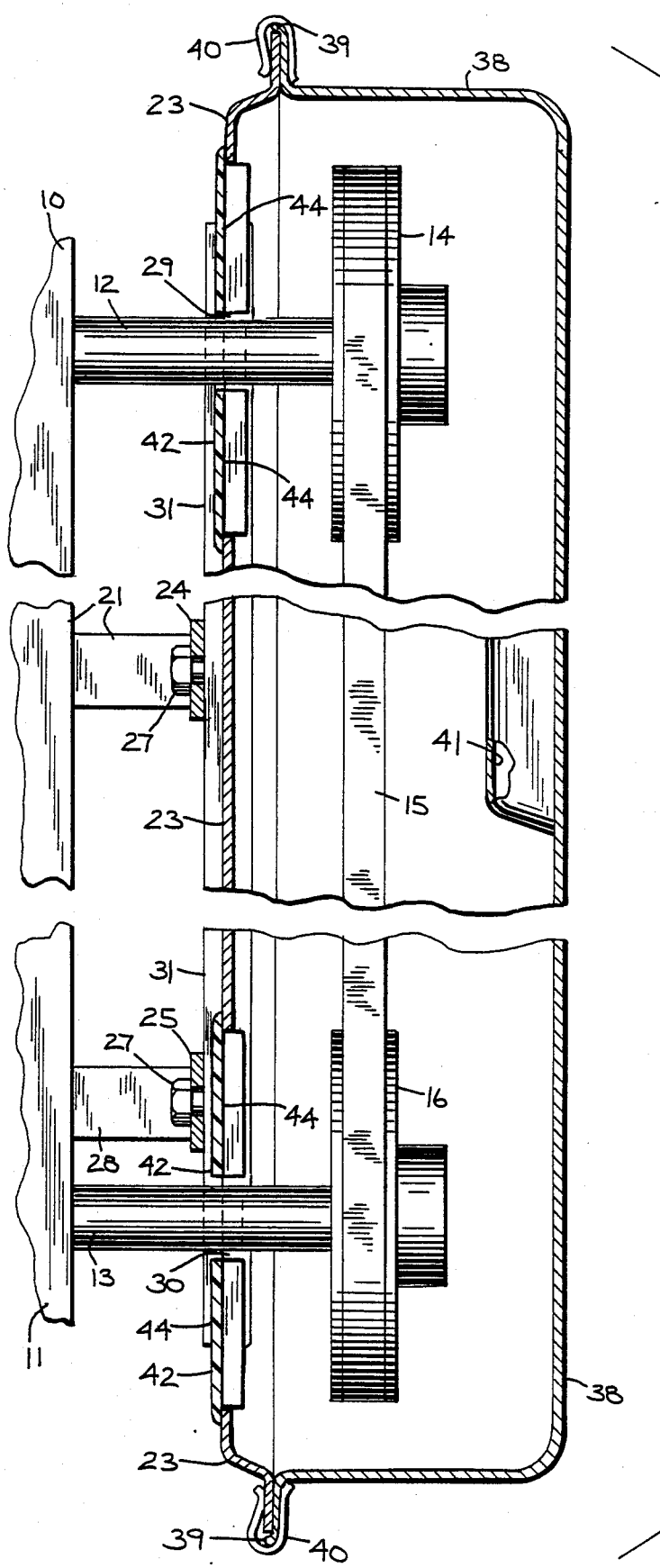

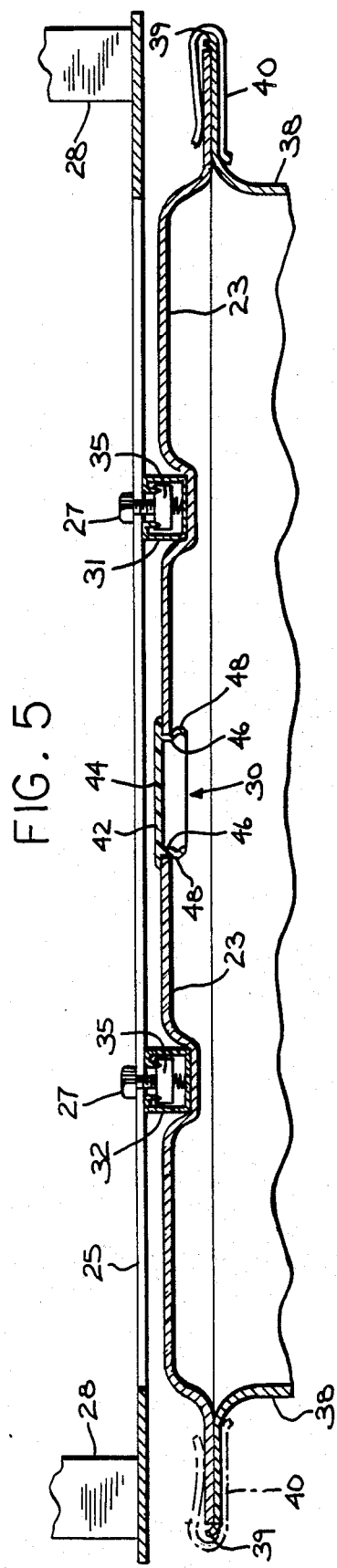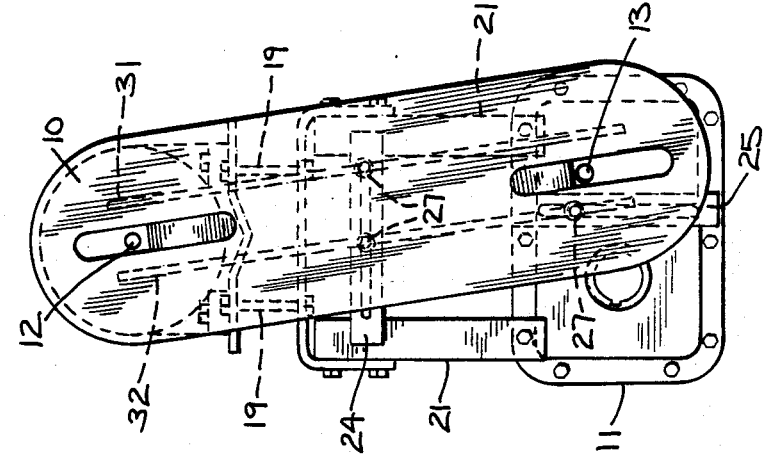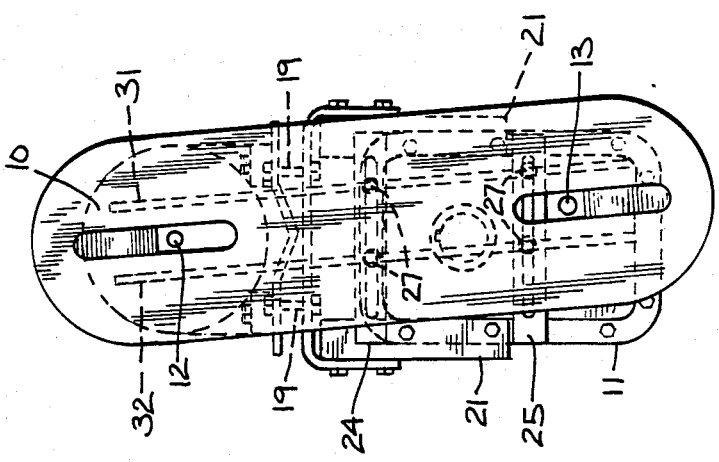

SAFETY GUARD

BACKGROUND OF THE INVENTION

This invention relates to safety guards for machinery. More particularly, it pertains to an enclosure for the driving and the driven shafts of the machinery and for the means of transmitting torque between the shafts.

Safety guards for machinery are well known. Their general purpose is to protect against foreign objects, such as debris, clothing, or an operator's hands, from coming into contact with moving parts of the machinery. Safety guards also may prevent parts of machinery, for example belts or chains, from causing damage should they break.

There are many designs of safety guards. One simple design consists of a protective shell that is welded or otherwise fastened directly to the machinery. An example of this type of design is shown in U.S. Pat. No. 4,504,093 to enclose the shafts and pulleys on a stripping machine. Other safety guards, however, instead of attaching directly to the machinery, are mounted on the shafts of the machinery. For example, in U.S. Pat. No. 3,576,142, a guard is attached to bearing blocks which are mounted on the shafts to support the guard.

Except for the simplest types, safety guards commonly consist of two pieces. One piece is either fastened to the machinery or mounted on bearing blocks. The second piece normally attaches to the first to form an enclosure for the moving components of the machinery.

The principle disadvantage of prior designs is that they are built for particular machinery set up in one manner. Thus, these made-to-order safety guards cannot easily be modified to accommodate machinery changes or changes in the position of the machinery. A second shortcoming of current designs relates to the accessibility of the guarded machinery. To inspect, adjust, or replace parts enclosed within the guard, the guard must be removed. Present guard designs frequently employ bolts, rivets, or other mechanical fasteners that hamper easy removal of the guard.

SUMMARY OF THE INVENTION

This invention provides a safety guard for enclosing the flexible drive between an assemblage of a drive shaft and a driven shaft. The safety guard includes a backplate having elongated openings that are adapted to receive the driving and driven shafts and are elongated along a line through the shafts. A cover is releasably mounted against the backplate to define an enclosure for the flexible drive. At least one mounting track is attached to the rear of the backplate. A mounting nut is slidably positioned within the mounting track, and a bolt fastens to the mounting nut to attach the safety guard to the assemblage of the driving and driven shaft. This aspect of the invention reduces the necessity of replacing or modifying the safety guard simply due to drive changes. The mounting track permits the same safety guard to be used with the same machinery despite the driving shaft being in a different position relative to the driven shaft. Additionally, the elongated openings in the backplate allow the safety guard to be used with sheaves or sprockets having an extended range of diameters. Further, the releasable cover provides easy access to the flexible drive for installation, adjustment, or inspection.

In another aspect of the invention, mounting strips are attached to the assemblage of the driving and driven shafts. The mounting strips include a slot to receive the bolt that is fastened to the mounting nut. The slots are arranged in a direction that intersects the mounting track. This aspect permits the same safety guard to be used with the drive shaft in an even greater variety of positions with respect to the driven shaft.

In another aspect, closure means are employed to block the unused portions of the openings in the backplate. This aspect more fully encloses the flexible drive to increase safety.

Thus, it is a principal object of the present invention to provide a safety guard which can be used with a wide variety of machinery arrangements without modification or additional parts. With relatively simple changes in the mounting elements, the same safety guard can be used with different arrangements of the same machinery, or can be removed and used with other machinery.

It is another object of this invention to provide a safety guard using fewer rivets or other mechanical fasteners for easier installation and improved access for inspection and maintenance.

It is still another object of this invention to provide a safety guard employing fewer sharp corners and edges, thereby improving safety.

It is yet another object of the present invention to provide a safety guard design that permits "nesting" of the guard parts to save space when storing safety guards.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 2 is a view in vertical section taken in the plane of the line 2—2 in FIG. 1;

FIG. 5 is a view in horizontal section taken in the plane of the 5—5 in FIG. 1;

FIG. 6 is a view in elevation and showing the safety guard in use with a particular arrangement of machinery; and FIG. 7 is a view in elevation similar to FIG. 6 but showing the safety guard in use with a different arrangement of machinery.

DETAILED DESCRIPTION OF THE PREFERRED EMBODIMENT

Figure 1:
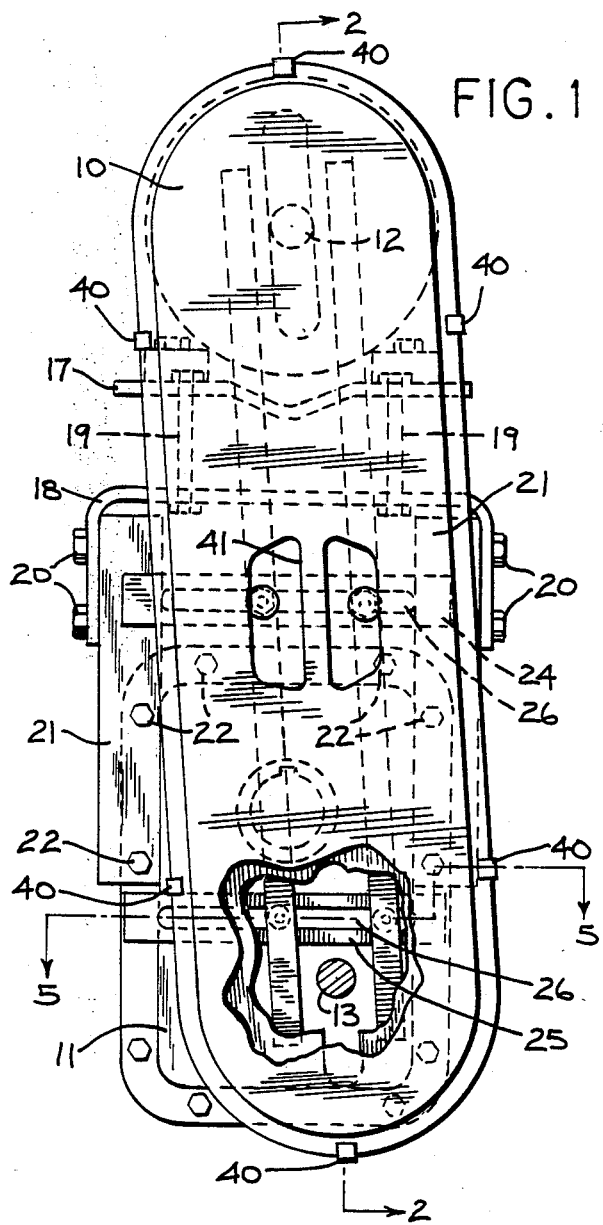
FIG. 1 is a view in elevation of a safety guard in accordance with the present invention with portions broken away for purposes of illustration.

The preferred embodiment of the safety guard is shown in FIG. 1 in use with a drive motor 10 and a driven machine in the form of a speed reducer 11. A drive shaft 12 protrudes from the drive motor 10. The drive shaft 12 rotates about an axis parallel to that of an input or driven shaft 13 which protrudes from the speed reducer 11. As seen in FIG. 2, the drive shaft 12 and the driven shaft 13 are connected by a flexible drive, in this case a motor sheave 14, a belt 15, and a driven sheave 16. The drive motor 10 is mounted on a motor base plate 17 (FIG. 1). The motor base plate 17 is fixed in one position above a mounting plate 18 by use of adjusting screws 19. The motor mounting plate 18 is in turn connected by bolts 20 to a motor height adapter 21, which is attached to the speed reducer 11 by suitable bolts 22.

The motor mounting equipment (consisting of the motor base plate 17, motor mounting plate 18, adjusting screws 19, bolts 20, and motor height adapter 21) is used to maintain the drive motor 10 and the drive shaft 12 in a fixed physical relationship with the speed reducer 11 and the driven shaft 13. By adjusting the motor mounting equipment, such as the adjusting screws 19, however, or by reorienting the drive motor 10 with respect to the speed reducer 11, a different physical relationship can be established between the drive shaft 12 and the driven shaft 13. Thus the motor mounting equipment allows the drive motor 10 and the speed reducer 11 to be operated using a variety of sheave ratios and belt lengths. What has been described thus far is known in the art.

Mounting strips 24 and 25 in the form of rectangular strips with elongated slots 26 running lengthwise along each strip, are attached to the speed reducer 11 and the motor mounting equipment. The elongated slots 26 of the mounting strips 24 and 25 are sufficiently wide to allow the threads of a mounting bolt 27 (best shown in FIGS. 2 and 4) to pass through the elongated slots 26, while retaining the head of the mounting bolt 27. In the arrangement illustrated in FIG. 1, the upper mounting strip 24 is attached to the motor height adapter 21. The lower mounting surface 25, however, is attached to a spacer 28 (not seen in FIG. 1, but shown in FIGS. 2 and 5) which is in turn attached to the speed reducer 11.

A primary purpose of the disclosed invention is to allow the safety guard to be used with the drive shaft 12 and the driven shaft 13 in a variety of positions with respect to one another. The way this is accomplished is embodied within the design of a backplate 23 (FIGS. 2, 3 and 5) of the safety guard and the means of securing the backplate 23 in a fixed position relative to the drive shaft 12 and the driven shaft 13.

Figure 3:
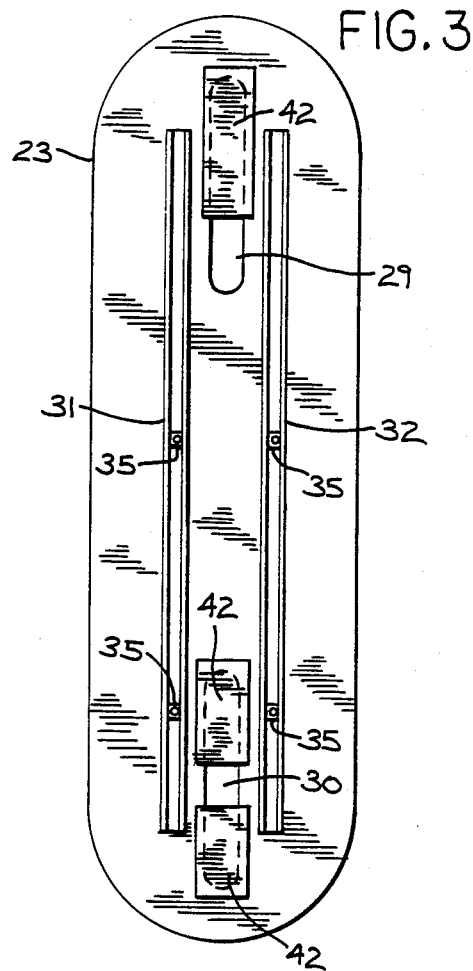
FIG. 3 is a view in elevation of the backplate of the safety guard.
Figure 4:
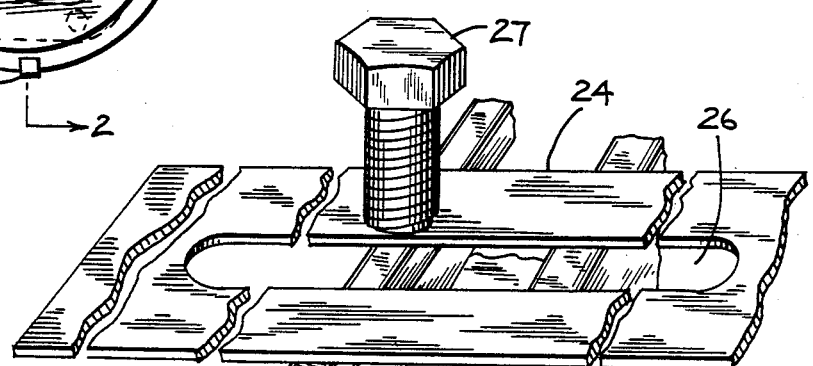
FIG. 4 is an enlarged view in perspective of the mounting elements for the safety guard.

As best seen in FIG. 3, the backplate 23 of the safety guard has two elongated shaft openings 29 and 30 near either end of the backplate 23. The elongated shaft openings 29 and 30 extend along the longitudinal axis of the backplate 23. Positioned on either side of the elongated shaft openings 29 and 30 and attached to the rear of the backplate 23, are two mounting tracks 31 and 32. Each mounting track 31 and 32 is substantially C-shaped with flanges 33 (FIG. 4) on both ends which point back toward a base 34 of the mounting track 31 and 32 to capture a mounting nut 35. The view in FIG. 4 shows the mounting track 31 without the backplate 23, and also shows that the mounting nut 35 has grooves 36 to receive the flanges 33 of the mounting track 31. Using a spring 37 (shown compressed in FIG. 4) which is braised to the mounting nut 35 and positioned against the base 34 of the mounting track 31, the grooves 36 of the mounting nut are loosely held against the flanges 33 of the mounting track 31. Serrations or teeth may be added to either the mounting nut 35 or the mounting tracks 31 and 32 to increase the grip between those two parts. The mounting nut 35 is thus in a position to receive the mounting bolt 27. This arrangement allows the mounting nut 35 to slide within the mounting track 31 over the length of the track 31.

The method of securing the backplate 23 allows it to be placed in an infinite variety of locations. The threads of the mounting bolts 27 pass through the elongated slots 26 in the mounting strips 24 and 25 and are threadably engaged into the mounting nut 35. By securing two or more of the mounting bolts 27 to the mounting nuts 35, the backplate 23, with the attached mounting tracks 31 and 32, is drawn tight against the mounting strips 24 and 25. The backplate 23 is then fixed in one position relative to the drive motor 10 and the speed reducer 11. An infinite variety of positions can be achieved, however, because the mounting bolts 27 can be positioned anywhere within the elongated slots 26 of the mounting strips 24 and 25. Preferably, the mounting strips 24 and 25 are secured to the machinery in a direction that intersects that of the mounting tracks 31 and 32. The backplate 23 can also be mounted in many positions because the mounting nuts 35 can be slidably located anywhere over the length of the mounting tracks 31 and 32.

As shown in FIG. 2, the drive shaft 12 passes through one elongated shaft opening 29 in the backplate 23, and the driven shaft 13 passes through the other elongated shaft opening 30. Because the shaft openings 29 and 30 are elongated, the same backplate 23 could be used with the same drive motor 10 and speed reducer 11 even if the physical relationship between those two machines changed, either by adjustment of the motor mounting equipment to lengthen or shorten the distance between the drive shaft 12 and the driven shaft 13, or by reorientation of the drive motor 10 with respect to the speed reducer 11. Likewise, the same backplate 23 could be used with other machinery if the shafts of the other machinery could fit through the elongated shaft openings 29 and 30 of the backplate 23.

A cover 38 (FIG. 2) is releasably mounted against the backplate 23 to form an enclosure for the flexible drive. A lip 39 around the perimeter of the cover 38 fits over the edge of the backplate 23, and supports the weight of the cover 38. Although the cover 38 and the backplate 23 may be held together by any means, this embodiment of the invention uses spring cover clips 40. The cover 38 or the backplate 23 could also be formed with ridges or recesses (not shown) around their perimeters to provide detents to hold the cover clips 40 in place. By using cover clips 40, the cover 38 can easily be removed to allow quick access to the flexible drive. To further aid easy removal, the cover 38 can be stamped or drawn with a handle 41 as shown in FIG. 1.

To more fully shield the shafts and the flexible drive, closure strips 42 (FIGS. 2 and 3) can be inserted into the elongated shaft openings 29 and 30. Each closure strip 42 has a flat portion 44 which is wider than the elongated shaft openings 29 and 30 (FIGS. 2 and 5). Legs 46 (FIG. 5) of the closure strip 42 extend outward from one side of the flat portion 44. Near the end of each leg 44 is a ridge 48. When the backplate 23 is securely in place relative to the drive motor 10 and the speed reducer 11, the legs 46 of a closure strip 42 are snapped inside the elongated shaft openings 29 and 30. The ridges 48 hold the closure strip 42 in place but also allow the closure strip 42 to be easily pried off. The closure strips 42 can be made of a variety of materials, such as metal or plastic. The closure strips 42 may be cut to the appropriate length for the specific installation.

In this embodiment of the invention, the cover 38 (see FIG. 2) is substantially dish-shaped, while the backplate 23 is substantially flat. The shape of the cover 38 and the backplate 23 may vary greatly, however, so long as the enclosure formed by the cover 38 and the backplate 23 is sufficiently large to house the flexible drive. As shown in FIG. 5, the backplate 23 is recessed in two places to receive the mounting tracks 31 and 32. Additionally, the perimeter of the backplate 23 is substantially flat to provide a surface against which the cover 38 can seat, and is raised somewhat to form a portion of the cavity where the flexible drive is enclosed. The backplate 23 can be constructed of a variety of materials. An open mesh backplate allows visibility of the flexible drive, while a solid material backplate reduces the amount of dirt contacting the flexible drive.

Comparison of FIGS. 6 and 7 illustrates the universal nature of the disclosed safety guard. The motor mounting equipment is set up differently in the two diagrams so that the drive shaft 12 and the driven shaft 13 are further apart in FIG. 7 than in FIG. 6. Specifically, the adjusting screws 19 are extended further in FIG. 7, and the motor height adapter 21 is more fully utilized in FIG. 7. Additionally, the speed reducer 11 has been rotated ninety degrees (90°) so that the driven shaft 13 is in the six o'clock position in FIG. 6, and in the three o'clock position in FIG. 7. Different mounting positions such as the two shown in FIGS. 6 and 7 may be necessary due to space restrictions.

Despite the different distances between the shafts, the rotated position of the speed reducer 11, and the changed set up of mounting equipment, the same safety guard can be used in both arrangements shown in FIGS. 6 and 7. Conveniently in this case, neither of the mounting strips 24 and 25 has changed positions. One mounting strip 24 remains connected to the motor height adapter 21, and the other mounting surface 25 remains connected to a spacer 28 (not shown) which is connected to the speed reducer 11. Nonetheless, the mounting strips 24 and 25 could be located anywhere on the mounting equipment or the machinery so long as the backplate 23 can be properly secured to the machinery. In FIG. 7, the mounting bolts 27 have moved along the mounting surface 24, and the mounting nuts 35 (not shown) have slid slightly along the length of the mounting tracks 31 and 32. Only one mounting bolt 27 is used in conjunction with the lower mounting surface 25 that is connected to the speed reducer 11. Thus, a single safety guard can easily be modified to be used with a new arrangement of the same machinery, or with new machinery arranged in a different manner.

The foregoing detailed description has been for the purpose of illustration. Thus, a number of modifications and changes may be made without departing from the spirit and scope of the present invention. For example, the safety guard is not limited to use with a drive motor 10 and a speed reducer 11, but can be used with any driving and driven shafts. Likewise, the mounting bolts 27 and the mounting nuts 35 could be interchanged such that the mounting bolts 27 are captured within the mounting tracks 31 and 32. Therefore, the invention should not be limited by any of the specific embodiments described, but only by the claims.

I claim:

1. A safety guard for enclosing a flexible drive between an assemblage of a drive shaft and a driven shaft, comprising:
   a backplate having elongated openings adapted to receive the driving and driven shafts, said openings being elongated along a line through the shafts;
   a cover releasably mounted against the backplate and defining therewith an enclosure for the flexible drive;
   at least one mounting track attached to the rear of the backplate; and
   a mounting nut slidably positioned within the mounting track and adapted to receive a bolt for attaching the safety guard to the assemblage of the driving and driven shaft.

2. A safety guard in accordance with claim 1, wherein there are a pair of mounting tracks straddling the line through the shafts.

3. A safety guard in accordance with claim 1, together with a mounting strip adapted for attachment to the assemblage and including a slot which receives the bolt, the mounting strip being adapted to be arranged in a direction that intersects the mounting track.

4. A safety guard in accordance with claim 1, together with closure means for blocking the unused portion of the openings in the backplate.

5. A safety guard in accordance with claim 4, wherein the closure means are strips that are wider than the elongated openings in the backplate, each strip having legs with ridges that snap into the elongated openings.

6. A safety guard for enclosing a flexible drive between an input shaft of a speed reducer and the drive shaft of a motor that is mounted by an assembly to the speed reducer, comprising:
   a pair of mounting strips one of which is mounted on the speed reducer and the other of which is mounted on the assembly, the mounting strips having elongated slots which are arranged generally transverse to a line through the shafts;
   a backplate having elongated openings for receiving the shafts, the openings being elongated along the line through the shafts;
   a pair of mounting tracks secured to the rear of the backplate, the tracks being disposed on each side of and generally parallel to the line through the shafts;
   removable fasteners joining the mounting tracks to the mounting strips; and
   a cover removably attached to the backplate and defining therewith an enclosure for the flexible drive.

7. A safety guard in accordance with claim 6, wherein the backplate is relatively flat and the cover is dished.

8. In combination with a drive motor having a drive shaft rotatably supporting a motor sheave, a driven machine having a driven shaft rotatably supporting a driven sheave, and a flexible drive connecting the drive motor to the driven machine, a safety guard comprising:
   a backplate having elongated openings adapted to receive the drive shaft and the driven shaft, said openings being elongated along a line through the shafts;
   at least one mounting track secured to the rear of the backplate, said mounting track housing a mounting nut slidably positioned within the mounting track;
   at least one mounting strip adapted to be attached to an assemblage of the drive motor and the driven machine, said mounting strip capable of supporting a bolt to be threaded into the nut of the mounting track; and
   a cover releasably mounted against the backplate and defining an enclosure for the flexible drive.

9. The combination as in claim 8, wherein the mounting strip includes a slot adapted to receive the bolt.

10. A safety guard kit having component parts capable of being assembled and attached to machinery to enclose a flexible drive between a drive shaft and a driven shaft, the kit comprising the combination of:
   mounting strips to be fastened to the machinery;
   a backplate having elongated openings, the openings being elongated along a line through the elongated openings;
   at least one mounting track to be secured to the rear of the backplate; and
   a cover releasably mountable against the backplate and defining therewith an enclosure.

11. The kit as in claim 10, wherein there are a pair of mounting tracks to be secured to the rear of the backplate, the mounting tracks straddling the line through the elongated openings.

12. The kit as in claim 10, further comprising a mounting nut that is slidably positioned within the mounting track and adapted to receive a bolt for attaching the safety guard to the machinery.

13. The kit as in claim 10, further comprising closure means for blocking the unused portion of the openings in the backplate.

14. The kit as in claim 13, wherein the closure means are strips that are wider than the elongated openings in the backplate, each strip having legs with ridges that snap into the elongated openings.

* * * * *